Dec. 15, 1925.
K. TAKATA ET AL
1,566,128
INTERNAL COMBUSTION ENGINE FOR KEROSENE AND CRUDE OIL
Filed July 12, 1922
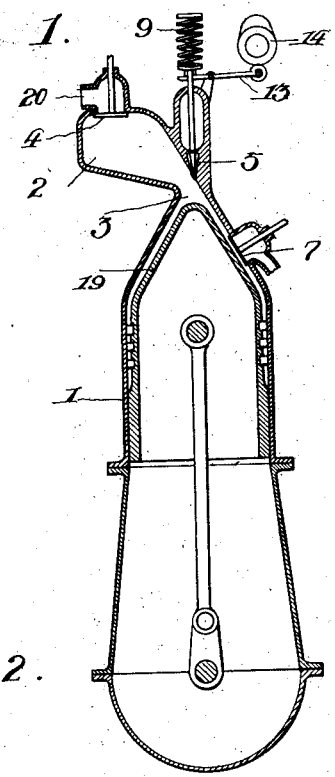
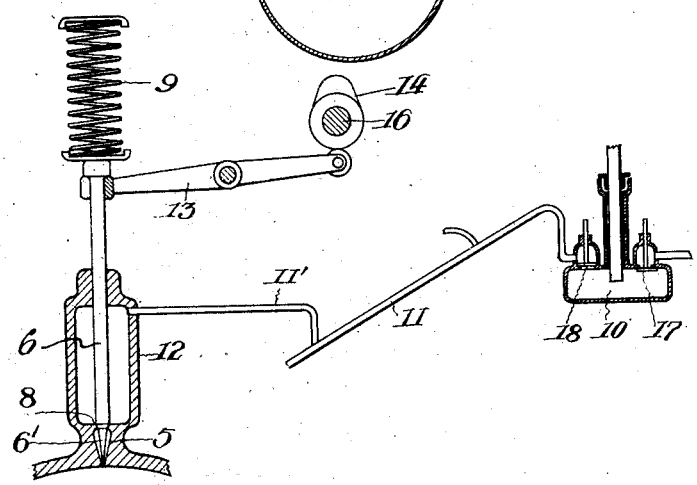
INVENTORS
Kamakichi Takata and
Paul Alexander Ritter
By B. Singer, ATTORNEY Patented Dec. 15, 1925.

1,566,128

UNITED STATES PATENT OFFICE.

KAMAKICHI TAKATA, OF KANDA-KU, TOKYO, AND PAUL A. RITTER, OF KOJIMACHI-KU, TOKYO, JAPAN.

INTERNAL-COMBUSTION ENGINE FOR KEROSENE AND CRUDE OIL.

Application filed July 12, 1922. Serial No. 574,560.

*To all whom it may concern:*

Be it known that we, KAMAKICHI TAKATA, a subject of the Emperor of Japan, and a resident of Kanda-Ku, Tokyo, Japan, and PAUL A. RITTER, a citizen of Germany, and a resident of Kojimachi-Ku, Tokyo, Japan, have invented new and useful Improvements in Internal-Combustion Engines for Kerosene and Crude Oil, of which the following is a specification.

This invention comprises certain improvements in four stroke cycle oil engines, and more particularly relates to that class of engine in which liquid fuel is injected by fuel pump and spraying needle valve into a restricted passage between combustion chamber and cylinder, and in which the heat of compression is in itself insufficient to ignite the oil and air mixture.

This invention has for its chief objects the utilization of heavy fuel oil in light high-speed engines firstly by a characteristic arrangment of the fuel injection valve, air intake valve, and igniter in the combustion chamber and of the exhaust valve in the cylinder, secondly by injecting the fuel by a characteristic injection valve suitable for timing and measuring off the small quantities of oil to be atomized for each working stroke of such small high-speed engines and suitable for keeping the small opening of the atomizer in proper working condition, and thirdly by employing for all the cylinders one comparatively large fuel pump of constant capacity per working stroke of plunger driven at a suitable low speed independent of the timing and measuring off action of the fuel injection valves, the fuel pressure in the injection valve supply pipes being regulated by a relief valve.

The compression of this engine is not high enough to produce self-ignition of the atomized fuel, but is high enough to start combustion by an electric ignition system when the engine is started at sufficient velocity, for example by compressed air or electric battery.

In the accompanying drawings:—

Figure 1 is an elevational view in section of an internal combustion engine in accordance with this invention.

Figure 2 is a detail elevational view partly in section of a fuel supply system of the engine shown in Figure 1.

Referring to Figure 1, in order that the oil spray may be thoroughly mixed with and vaporized by the hot air, the fuel is sprayed into a restricted passage 3 connecting the combustion chamber 2 with the working cylinder 1.

The fuel is injected during the compression stroke of the piston 19 at or about a time when the piston reaches its highest velocity. The injection is directed against the flow of the compressed hot air driven through the passage 3 by the working piston. The atomized fuel is mixed with the hot air passing at high velocity through the restricted passage 3 and is forced back into the combustion chamber 2, where further vaporization and partial gasification takes place by the increasing temperature of the compression. The time and duration of injection is not of such consequence in regard to the indicator diagram in this internal combustion engine, in which combustion takes plate at practically constant volume, and therefore the adjustments of the mechanical means for injection are not as sensitive, as in engines of the constant pressure cycle (Diesel engines) in which injection of the fuel under very high pressure must take place at an exact moment to ensure satisfactory combustion as shown by the indicator card. This fact is of importance for small high-speed oil engines.

The air intake valve 4, the spark plug, and the fuel injection nozzle 5 and needle valve 6, are located on the combustion chamber 2, and the exhaust valve 7 on the cylinder. By this arrangement the spark plug and injection needle are protected against the exhaust gases driven out by the working piston during the exhaust stroke. The combustion chamber 2 is washed out by pure air during the intake stroke, and the least polluted air is kept in the combustion chamber 2 for the next combustion.

Referring more particularly to Figure 2, the fuel injection valve 6, spraying the fuel into the restricted passage 3, measures off the right amount of fuel according to the load of the engine. Each cylinder is provided with one injection valve. The fuel is supplied to the injection valve 6 through a main pipe 11, branch pipe $11^1$, and pressure chamber 12. The pressure in the pipe system is maintained constant by the fuel pump 10. The valve seat 8 of the valve 6 is kept closed by a spring 9. The valve 6 is opened by any suitable drive, for instance by a lever 13 and roller 15 arranged in co-operation with a cam 14 on a cam shaft 16 driven by the engine. The lift of the valve 6 may be varied according to the load by any suitable means, for instance by providing the cam 14 in a longitudinally inclined form adjustable lengthwise with the cam shaft, and the pressure in the pipe system be kept constant by means of a relief valve; or the lift of the injection valve may remain constant and the pressure in the pipe system be regulated by means of a pressure-regulating valve in the pump discharge pipe to maintain the desired amount of fuel per working stroke of the engine piston.

The fuel injection valve 6 terminates in a pointed needle extension $6^1$ protruding through the opening of the spraying nozzle 5. The opening of the nozzle and the needle extension of the valve are so shaped as to determine the free area of the passage for the fuel. The lift of the needle extension and the pressure of the fuel in the supply pipe determine the amount of fuel according to the load of the engine. The object of this needle extension $6^1$ is to accomplish a comparatively large lift of the injection valve 6, independent of the valve seat proper, for the very small quantities of fuel which are consumed per working stroke of small high-speed engines. Further the extension point of the needle valve protrudes through the opening of the spraying nozzle to keep this opening clear of carbon deposits, acting therefore as a self-cleaning device for this important part of the engine. Connected to the variable lift gear or to the pressure regulating valve in the pressure pipe system is the throttle for the air induction pipe 20.

As the time and duration of the fuel injection and also the amount of fuel are regulated by an injection needle valve on each cylinder, only one fuel supply pump for all the cylinders is required.

This pump 10 is driven at any convenient slow speed and keeps the fuel supply to the injection valves 6 under pressure. The pump plunger delivers by each delivery stroke a constant volume, independent of the amount injected by the fuel injection valve 6, no means being provided for regulating the time of opening or closing of the suction valve 17 or discharge valve 18 or the stroke of plunger. The pump delivers a quantity of fuel much larger than needed for injection, in order to ensure a practical size of pump for the small amount of fuel needed by such high-speed oil engines. The pressure in the fuel supply system is regulated and the surplus amount of fuel returned into the fuel tank or suction side of the pump by a relief valve or pressure regulating valve.

Having now particularly described and ascertained the nature of our said invention, and in what manner the same is to be performed, we declare that what we claim is:—

In a four stroke cycle internal combustion engine a cylinder having a tapered inner end, a piston therein also having a tapered inner end, so that a restricted passage is formed in said inner end of the cylinder when the piston is in instroke position, a combustion chamber having an air intake valve and also communicating with the cylinder through said restricted passage, means to supply fuel under pressure to said restricted passage and including a needle valve and means to operate the needle valve, and an exhaust valve opening into the cylinder, so that said restricted passage is between the air intake valve and the exhaust valve, so that the igniter and the injection valve needle are protected against the flow of the exhaust gas and the combustion chamber becomes filled with pure air after the combustion of each charge and together with the igniter is cleaned thereby and the compressed hot air in the combustion chamber becomes mixed with and vaporizes the fuel supplied to said restricted passage.

In testimony whereof we affix our signatures.

KAMAKICHI TAKATA.
PAUL A. RITTER.